April 15, 1930.    C. D. STEWART    1,754,244
BRAKE VALVE PEDESTAL
Filed Feb. 8, 1928
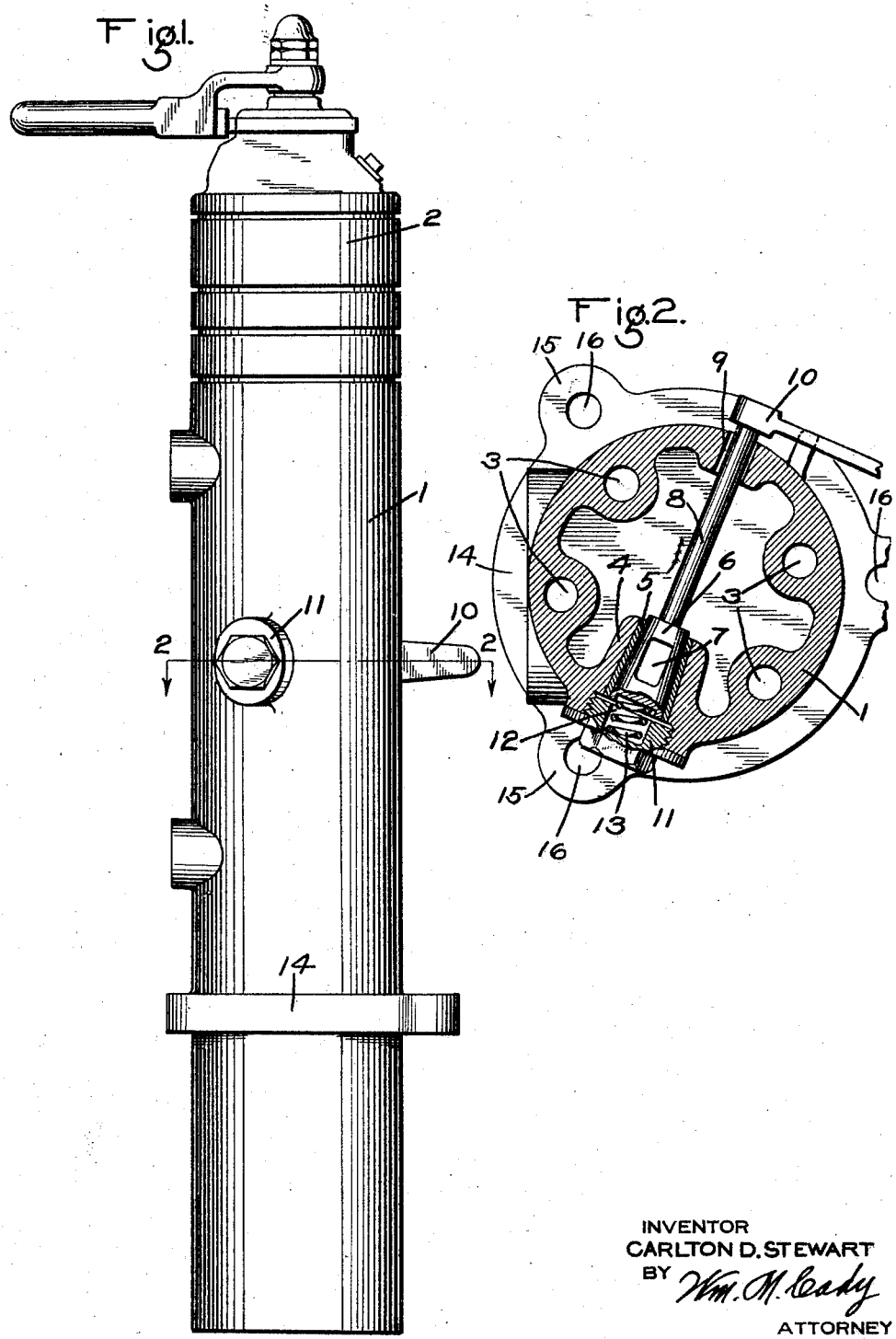
INVENTOR
CARLTON D. STEWART
BY
ATTORNEY Patented Apr. 15, 1930

1,754,244

UNITED STATES PATENT OFFICE

CARLTON D. STEWART, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA

BRAKE-VALVE PEDESTAL

Application filed February 8, 1928. Serial No. 252,924.

This invention relates to cut-out cocks of the type employed in connection with a railway fluid pressure brake system for controlling communication through the brake pipe to the engineer's brake valve device on the locomotive.

It has been proposed to provide a pedestal or column for supporting the engineer's brake valve in the cab of the locomotive, as disclosed in Patent No. 1,582,918, of Clyde C. Farmer, dated May 4, 1926, the pedestal being provided with cored passages which lead to the brake valve device and which are connected to pipes at the base of the pedestal. For controlling the cored passage which communicates with the usual brake pipe, a cut-out cock is provided.

It is highly desirable to provide a cut-out cock installation for the above type of brake valve support which shall be simple in construction and at the same time adapted to prevent leakage of fluid under pressure at the cut-out cock, and the principal object of my invention is to provide a cut-out cock which will meet these requirements.

In the accompanying drawing, Fig. 1 is an elevational view of a brake valve device mounted on a pedestal and embodying my invention; and Fig. 2 a section on the line 2—2 of Fig. 1.

As shown in the drawing, a pedestal 1 is provided having applied at its upper end an engineer's brake valve device 2. The pedestal 1 is provided with a plurality of cored passages 3 which lead to the brake valve device and which are connected at the base of the pedestal to corresponding pipes (not shown).

According to my invention, at a desired location, the pedestal 1 is provided with a boss-like section 4 which extends radially and is provided with a tapered bore containing a tapered bushing 5.

Mounted in said bushing is a tapered plug valve 6 which is provided with a waterway 7 for controlling communication through a cored passage (not shown) similar to the cored passages 3 and which passage leads to the brake valve device 2 and is connected at the base of the pedestal with the usual brake pipe (not shown).

Carried by the plug valve or cut-out cock 6 is a stem 8 which extends radially and transversely of the pedestal and passes through an opening 9 formed in the wall of the pedestal diametrically opposite to the plug valve.

Outside of the pedestal, an operating handle 10 is secured to the stem 8.

The larger end of the plug valve 6 faces outwardly and the smaller end faces toward the longitudinal axis of the pedestal, and a threaded opening is provided in the pedestal adjacent the larger end of the plug valve, in which is secured a screw plug 11. The plug 11 is provided with a cavity 12 for receiving a coil spring 13 which presses against the plug valve 6 when the plug 11 is screwed home.

By disposing the plug valve 6 with its smaller end facing the axis of the pedestal and by extending the operating stem 8 through an opening in the wall of the pedestal, the space at the larger end of the plug valve can be made leak tight by the screw plug 11, without the necessity for employing a stuffing box and packing, as would be necessary if the stem were connected to the plug valve at the opposite side of the plug valve.

At an intermediate point, the pedestal is provided with a flange 14 having a plurality of lugs 15 provided with bolt holes 16, the flange being adapted to be applied to the cab floor with the portion of the pedestal below the flange extending through the cab floor, or a rigid bracket (not shown) may be secured to the boiler head and the flange 14 may be bolted to the bracket.

It will also be noted that the construction is very simple and does not require any involved modification of the pedestal structure.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a brake valve device and a pedestal having cored passages and supporting said brake valve device, of a tapered plug valve mounted in a transverse bore formed in said pedestal and an operating stem carried by said plug valve and extending through an opening in said pedestal.

2. The combination with a brake valve device and a pedestal having cored passages and supporting said brake valve device, of a tapered plug valve mounted in a transverse bore formed in said pedestal and an operating stem carried by said plug valve and extending through the interior of said pedestal and through an opening in the wall of the pedestal.

3. The combination with a brake valve device and a supporting pedestal therefor, of a tapered plug valve mounted in a transversely disposed bore of said pedestal and an operating stem secured to said valve and extending through an opening in the pedestal wall opposite to said plug valve.

4. The combination with a brake valve device and a supporting pedestal therefor, of a tapered plug valve mounted in a radially disposed bore in the wall of said pedestal and an operating stem carried by said plug valve and extending through an opening in the pedestal wall diametrically opposite the plug valve.

5. The combination with a brake valve device and a supporting pedestal therefor, of a tapered plug valve mounted in a radially disposed bore in the wall of the pedestal and having the smaller end of the plug valve facing the longitudinal axis of the pedestal, an operating stem secured to said valve at the smaller end and extending through an opening in the wall of the pedestal, and a handle for operating said stem.

In testimony whereof I have hereunto set my hand.

CARLTON D. STEWART.